United States Patent [19]
Eising

[11] 3,726,475
[45] Apr. 10, 1973

[54] BACK PRESSURE VALVE FOR THERMAL COMPENSATING DIP TUBE

[75] Inventor: John P. Eising, Oconomowoc, Wis.

[73] Assignee: A. O. Smith Corporation, Milwaukee, Wis.

[22] Filed: Dec. 1, 1971

[21] Appl. No.: 203,718

[52] U.S. Cl. .....................236/102, 236/93, 126/362
[51] Int. Cl. ...............................................F24h 9/20
[58] Field of Search........................236/93, 102, 103; 126/362, 350

[56] References Cited

UNITED STATES PATENTS

| | | | |
|---|---|---|---|
| 2,792,180 | 5/1957 | Flagg | 236/93 |
| 3,258,005 | 6/1966 | Grayson | 126/362 |

Primary Examiner—William E. Wayner
Attorney—Andrus, Sceales, Starke & Sawall

[57] ABSTRACT

A dip tube used as a conduit of cold water into a water heater tank is made of two concentric tubes with one tube having a higher coefficient of expansion than the other. Longitudinally spaced apertures are provided in the upper portion of the tubes and the apertures are offset under predetermined low temperature conditions. The apertures of one tube are placed in registry with the apertures of the other tube upon increase in the temperature of the water stored in the tank which expands one tube longitudinally with respect to the other to discharge the incoming cold water into the tank through the apertures at various levels within the upper portion of the tank to overcome stacking. The improvement here consists of providing the lower end of the dip tube with a flexible or resilient back pressure valve to provide a moderate variable flow restriction at the lower end of the tube so that when the apertures are in registry the flow of incoming cold water into the upper portion of the tank through the apertures is substantially increased. A bleed passageway is provided in the lower end of the dip tube above the valve for a controlled minimum flow of incoming cold water through the dip tube and discharge at the lower end to eventually effect contraction of the concentric tubes and offsetting of the apertures therein.

4 Claims, 5 Drawing Figures

PATENTED APR 10 1973　　3,726,475

BACK PRESSURE VALVE FOR THERMAL COMPENSATING DIP TUBE

BACKGROUND OF THE INVENTION

This application is directed to an improvement in the thermal compensating dip tube described and claimed in a copending application of the same inventor, Ser. No. 161,555 filed July 12, 1971, now abandoned.

One of the problems in the storage of hot water in water heater tanks is that the water stratifies in layers with the hottest water being located at the top of the water heater tank. Because this water upon intermittent draw-off may reach boiling temperatures and is the water drawn first from the heater tank, there is danger if injury in the draw-off of such high temperature water. The cold water in a water heater normally is discharged into the bottom portion of the tank by a dip tube suspended from the upper head of the tank of the water heater.

Previous efforts involving dip tube constructions for mixing cold water with the hot water, or drawing off the hot water in the upper portion of the tank to the lower portion, are illustrated by patents like Merino U.S. Pat. No. 3,251,346, Bordeaux U.S. Pat. No. 3,285,241 and Conner U.S. Pat. No. 2,592,863.

The present invention provides a dip tube of two concentric tubes with one tube having a greater coefficient of expansion than the other to register apertures or passageways in the upper portions of the respective tubes upon the greater expansion of one tube upon a rise in the temperature of the water stored in the water heater tank with respect to the other tube to discharge incoming cold water from the dip tube at various levels throughout the upper portion of the water heater.

In order to substantially completely eliminate the problem involved with the stacking of the hot water, a back pressure valve is secured to the lower end of the dip tube and provides a moderate restricted flow of incoming cold water from the dip tube into the bottom of the water heater tank and this results in a greater proportional flow from the apertures in the upper portions of the dip tube when the apertures are in alignment. A bleed port or other discharge passageway is provided in combination with the back pressure valve to provide for a controlled minimum flow rate of incoming cold water through the dip tube for discharge at the lower end to eventually effect contraction of the tubes and offsetting of the apertures therein.

SUMMARY OF THE INVENTION

It is common practice to suspend a dip tube from the upper head of a water heater tank which extends downwardly to the lower portion of the heater and serves as a conduit for the inlet of cold water. Furthermore, it is known that the water tends to stack in a water heater tank upon intermittent withdrawal of water so that there may be water at the top of the tank which is heated to a scalding temperature.

The stacking problem is overcome by the invention wherein the dip tube is formed of two concentric tubes with one tube being of a material which has a greater coefficient of expansion than the other. Either the inner tube or the outer tube may have the greater coefficient of expansion. Successful operation of the invention has been carried out, for example, by providing an inner tube of stainless steel and an outer tube of plastic such as polypropelene. The inner steel tube may be secured at its upper end to a fitting which is threaded into the upper head of a water heater tank and the outer polypropylene tube is slid over the stainless steel tube and is spaced from the fitting and free at the upper end. The lower end of the outer tube may be secured to the inner tube by screws or the like and the inner steel tube at its lower end normally beyond the upper tube. The outer tube, however, could extend beyond the lower end of the inner tube or the tubes could be co-extensive.

Each of the concentric tubes is provided with longitudinally and circumferentially spaced apertures or passageways in the upper portion of the respective tubes which are offset under predetermined low temperature conditions of the water in the tank such as 60° F. When the temperature of the water in the heater tank rises, the outer tube expands upwardly or telescopes over the inner tube to place the corresponding apertures in the concentric tubes in registry whereby incoming cold water is discharged through the apertures at various levels throughout the upper portion of the water heater. When the tubes are cooled by incoming cold water they contract with the tube having the greatest coefficient of expansion contracting the most, and the apertures in the tubes are offset and the incoming cold water is then directed to the bottom of the tank.

In order to increase the flow of cold water through the apertures in the tubes when the apertures are in registry, a back pressure valve is secured to the lower discharge end of one of the concentric tubes of the dip tube which extends beyond the other tube. This valve provides a moderate variable flow restriction at the bottom of the tube which substantially prevents discharge of fluid from the lower end of the dip tube when the apertures are in registry but which is flexible enough to open when the apertures are closed to provide for a high flow rate of discharge of incoming cold water into the bottom of the tank. In addition, bleed ports or passageways are provided at the discharge end of the dip tube above the back pressure valve so that there is a controlled minimum flow of incoming cold water through the dip tube and out the lower end in the event the back pressure valve is closed. This flow of incoming cold water through the dip tube is desirable so that the concentric tubes will tend to contract and eventually offset the apertures in the upper portion of the dip tube to close them against discharge of incoming cold water into the upper portion of the water heater tank.

DESCRIPTION OF THE DRAWING

Referring to the drawings, FIG. 1 illustrates a water heater 1 having a hot water outlet 2 at the top and a fitting or nipple 3 also at the top for connection to a cold water supply and from which is suspended dip tube 4 for discharge of incoming cold water into the water heater 1. The heater illustrated is heated by the gas burner 5.

As illustrated in FIGS. 2 and 3, the dip tube 4 is formed of two concentric tubes consisting of the inner tube 6 and the outer tube 7. The inner tube may be of a material having a coefficient of expansion such as stainless steel, which is lower than that of outer tube 7. Outer tube 7 may be of a plastic material such as polypropylene, high density polyethylene or polysulfone. The materials selected for each tube should have a considerable difference in their coefficients of expansion. The combination of stainless steel and plastic material has the advantages that plastic may have as much as ten times greater coefficient of expansion than steel. The invention also contemplates that the tubes may be reversed so that the inner tube 6 would be of material having a higher coefficient of expansion than the outer tube 7.

It is desirable that one of the tubes at the discharge end of dip tube 4 at the bottom of water heater 1 extend beyond the other, and FIG. 2 illustrates the inner tube 6 as extending beyond the outer tube 7. Inner tube 6 also extends beyond outer tube 7 at the upper end and is secured to fitting 3 such as by a press fit by insertion of the sleeve 8 between the upper end of inner tube 6 and the inside of the wall of fitting 3. At the lower end, the respective tubes 6 and 7 are illustrated as secured together by a plurality of screws 9 which provide a tight fit of the tubes at that area. Other connection means can also be employed.

Figure 1:
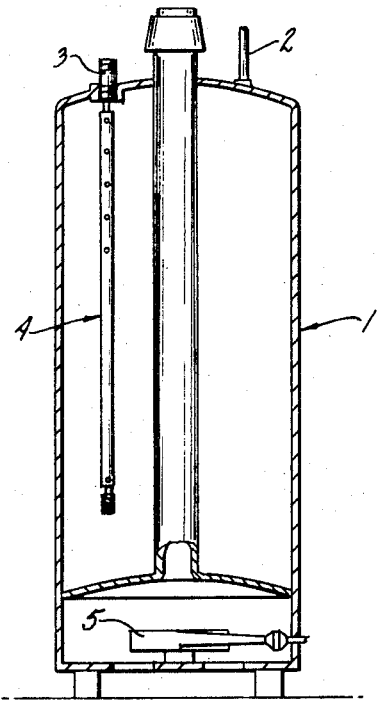
FIG. 1 is a vertical section of a water heater embodying the dip tube construction of the present invention.

The upper end of outer tube 7 is free and is spaced from fitting 3. The outer tube 7 is also of a slightly greater diameter with respect to inner tube 6 so that it can freely move over inner tube 6 because of its greater expansion characteristics when subjected to hot water.

The outer tube 7 is provided with the circumferentially and longitudinally spaced apertures or holes 10 which, under a predetermined low temperature condition, are offset from corresponding holes or apertures 11 provided in inner tube 6. The apertures in tubes 6 and 7 are in the upper portions of the dip tube such as, for example, within 6 to 8 inches from the top of the water heater tank. For example, with the water at a temperature of 60° F., the apertures 10 and 11 would be offset, as illustrated in FIG. 2, and incoming cold water would not flow through apertures 10 and 11 but rather be discharged from the lower end of dip tube 4.

Figure 4:
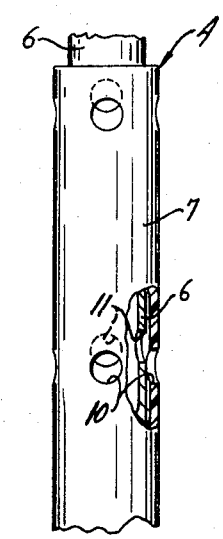
FIG. 4 is an elevational view of a portion of the dip tube illustrated in FIG. 2 with the apertures in partial registry.

However, with increase in temperature in the water stored in water heater 1, such as to boiling temperature at the upper portion of the heater 1, the outer tube 7, having the greater coefficient of expansion, expands upwardly on inner tube 6 to register apertures 10 and 11 of the respective tubes 6 and 7 as illustrated in FIG. 4. This results in incoming cold water being discharged from dip tube 4 through apertures 10 and 11 at various levels in the upper portion of the water heater. The amount of cold water discharged through apertures 10 and 11 depends on a number of factors. For example, the discharge will depend on whether the apertures 10 and 11 are closed due to the position of tubes 6 and 7 relative to each other or whether the apertures 10 and 11 are in partial or complete registry. When apertures 10 and 11 of tubes 6 and 7 are offset and not in registry, a minimal amount of incoming cold water leaks into the tank through apertures 10 and 11. This leakage is desirable in that it effects an increase in the amount of water which can be drawn off above a predetermined temperature, such as 120° F.

The operation of a water heater at low flow rates of incoming cold water is improved by the use of a back pressure valve on the lower end of dip tube 4 which provides a variable flow restriction and results in a greater proportion of incoming cold water flow through apertures 10 and 11 in the upper portion of dip tube 4 when the apertures are in registry.

Figure 2:
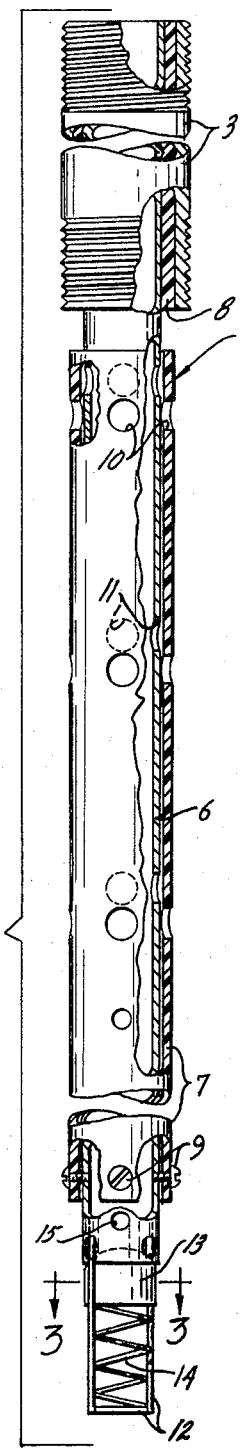
FIG. 2 is an elevational view of the dip tube of the invention with parts broken away and sectioned with the apertures of the tubes offset, and illustrating one type of back pressure valve.
Figure 3:
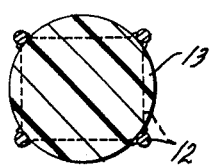
FIG. 3 is an enlarged section taken on lines 3—3 of FIG. 2 to illustrate the cage construction of the back pressure valve of FIG. 2.

Referring to FIGS. 2 and 3, there is illustrated one embodiment of the back pressure valve which may be utilized. The valve consists of the cage 12 which is suitably secured, such as by welding, to the lower discharge end of the inner concentric tube 6 which extends beyond the outer tube 7. The cage 12 permits relatively unrestricted discharge of incoming cold water from the lower end of dip tube 4 when the back pressure valve is open. A ball-like valve 13 normally is held seated against the lower end of tube 6 by a coil spring 14 which rests on the bottom end of cage 12. Coil spring 14 is of a strength to close the lower end of tube 6 by valve 13 when the incoming cold water is flowing into dip tube 4 at a lower flow rate so that there is a greater proportional flow through apertures 10 and 11 into the upper part of the heater 1 when the apertures are in registry. However, coil spring 14 is sufficiently flexible so that valve 13 will move off its seat at a high flow rate of incoming cold water and thus not offer an excessive pressure drop by excessively restricting discharge of incoming cold water into the bottom of water heater 1 from dip tube 4.

In order to insure that the concentric tubes 6 and 7 will eventually contract to place apertures 10 and 11 out of registry and prevent further discharge of cold water into the tank therethrough it is desirable that there be a controlled minimum flow of cold water through dip tube 4 and discharge of the cold water from the lower end of the tube. This may be accomplished in various ways. The back pressure valve may be constructed so as to permit flow of cold water through a passageway in the center of valve 13 or on one side of the seat of the valve, or the flexible construction of the valve may be such as to permit a minimum flow past the seat of valve 13 under various flow rates.

One construction which has supplied the required controlled flow of cold water from the discharge end of dip tube 4 is illustrated in FIG. 2 where a bleed port 15 is provided in the lower wall of inner concentric tube 6 above the back pressure valve so that some incoming cold water flowing in dip tube 4 will be discharged therethrough. More than one port 15 may be provided and if the concentric tubes extend coextensively, the port or ports 15 would extend through both tubes preferably below the screws 9 or other securing means employed to secure the tubes together.

Figure 5:
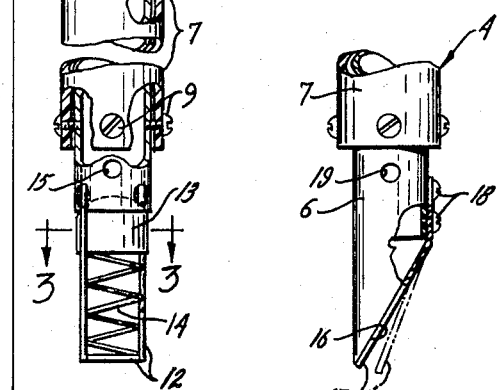
FIG. 5 is an elevational view of another type of back pressure valve with parts in section.

Another embodiment of the invention is illustrated in FIG. 5 where the inner tube 6 has a tapered end 16 which is normally closed by the flexible reed 17 of metal or other material. Reed 17 extends upwardly along the wall of tube 6 and is secured thereto by screws 18. As with the first embodiment, the reed 17 providing the back pressure valve in this embodiment is of the variable orifice type so as to provide a moderate variable flow restriction at the bottom of dip tube 4 so that there is a greater proportional flow from the apertures 10 and 11 when the apertures are in registry, but which will readily open for discharge of incoming cold water at a high flow rate. The bleed hole or passageway 19 is provided in inner tube 6 and functions in the same manner as described with respect to bleed hole 15 in FIG. 2.

Other types of back pressure valves may be employed at the lower end of dip tube 4 which function like the back pressure valve illustrated in FIGS. 2 and 5. Furthermore, the back pressure valves employed may be secured to the outer concentric tube 7 in the event it is desirable that tube 7 extend at its lower end beyond tube 6. Apertures 10 and 11 may also be of other shapes than round such as a rectangular configuration.

An example of the efficiency of the thermal compensating dip tube is described in the co-pending application above referred to, and it is further pointed out there how the stacking problem in water heaters has been overcome by the concentric dip tube construction.

Draw off rates in a water heater may vary considerably, and particularly at low flow rates the stacking characteristics can be improved and the stacking problem virtually eliminated by the addition of the back pressure valve described and shown.

Various modes of carrying out the invention are contemplated as being within the scope of the following claims, particularly pointing out and distinctly claiming the subject matter which is regarded as the invention.

I claim:

1. A thermal compensating dip tube for use in a tank for storing hot water, comprising a pair of tubes secured together in concentric relation with one tube having a greater coefficient of expansion than the other and free over the greater extent thereof to expand and contract longitudinally with respect to the other tube, apertures provided in longitudinally spaced relation in the upper portions of each tube with the apertures in one tube offset longitudinally in spaced relation with respect to the apertures of the other tube under predetermined low temperature conditions and the corresponding apertures of the respective tubes being placed in registry with each other upon the greater expansion of the tube with the highest coefficient of expansion with respect to the other tube when the tubes are exposed to higher temperature water to adapt the dip tube to discharge incoming cold water into the tank through said apertures at different levels in the upper portion of the tank, a flexible back pressure valve secured to the lower end of the dip tube from which incoming cold water is discharged into the bottom of the tank, said valve being substantially closed when the apertures of the tubes are in registry to provide a back pressure in the incoming cold water for an increased flow through said apertures and readily opening when the apertures are not in registry for discharge of the incoming cold water into the bottom of the tank, and at least one passageway provided at the lower end of the dip tube to effect a minimum flow of incoming cold water through the dip tube for discharge at the lower end to effect eventual cooling of the concentric tubes and closure of the apertures upon contraction of one tube a greater extent than the other tube.

2. The structure of claim 1 with one of the concentric tubes extending beyond the other at the lower discharge end of the dip tube, and the passageway comprising at least one bleed port in the wall of the last named concentric tube.

3. The structure of claim 1, and the back pressure valve including a cage secured to the lower end of the dip tube, adapted for discharge of incoming cold water therethrough when the valve is open, a spring seated on the bottom of the cage, and a ball-like valve disposed in the upper end of the cage and normally urged upwardly by the spring to seat on and close the lower end of the dip tube discharging incoming cold water into the bottom of the tank but opened when there is a high flow rate of incoming cold water for discharge of cold water therethrough and out through said cage.

4. The structure of claim 1, and the back pressure valve including a tapered end provided on the lower end of the dip tube, and a flexible reed member extending over and normally closing the tapered end of the dip tube with one end of the reed secured to the wall of the tube, and said reed moving to open position upon increase in the flow rate of incoming cold water into the dip tube.

* * * * *